June 9, 1964 K. J. STALLER 3,136,878
SOLDERING IRON
Filed June 23, 1960
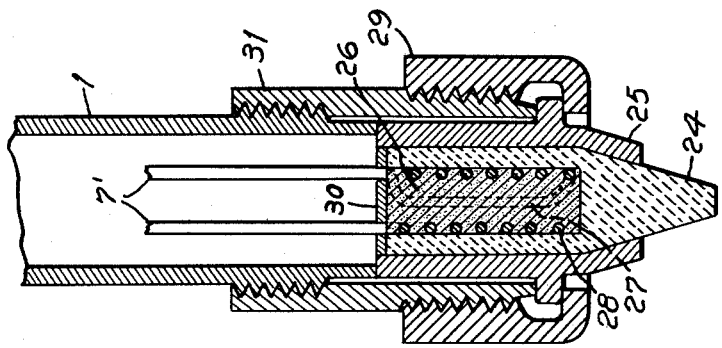
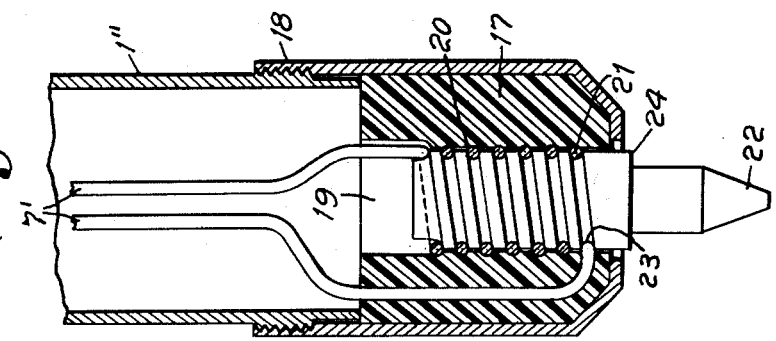
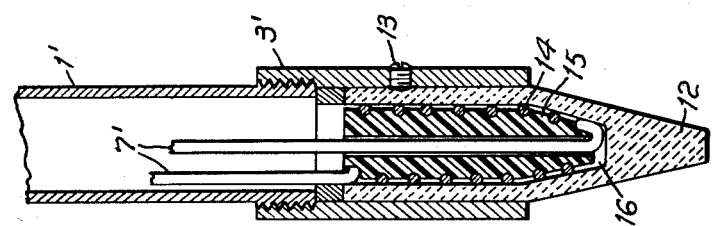
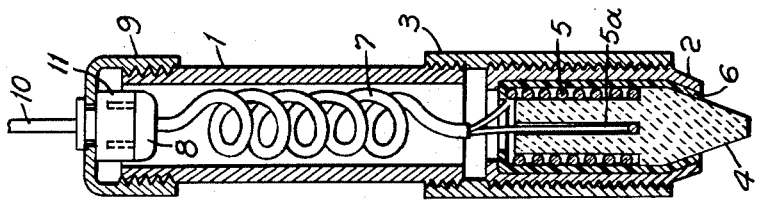
INVENTOR.
KAREL J. STALLER
BY
ATTORNEY 3,136,878
SOLDERING IRON
Karel J. Staller, Rutherford, N.J., assignor to International Telephone and Telegraph Corporation, Nutley, N.J., a corporation of Maryland
Filed June 23, 1960, Ser. No. 38,213
4 Claims. (Cl. 219—239)

This invention relates to soldering irons and more particularly to those soldering irons with tips made from electrical insulating material of substantially good heat conductivity.

Soldering irons have generally been provided with working tips made of copper, or copper alloys because copper has a very high heat conductivity which is desirable for efficient soldering. Copper has been most widely used because of its high heat conductivity and wetability by tin, which appears in solders of many types. Copper, and many of copper alloys however, possesses the disadvantages that it rapidly corrodes by reacting with fluxes used with certain solders, such as ammonium chloride; and that it oxidizes when heated while idle between the soldering operations. Moreover, copper rapidly wears away due to mechanical softness, and copper tips may not be used for extended periods without formation of bronze composed of copper with tin and other metals found in the solder itself.

Because copper dissolves readily in molten tin or lead, the tips have to be cleaned often. In order to remove the alloy formed, the soldering tip surface is customarily ground or filed down until a fresh copper surface is exposed. While this renewal is more or less satisfactory from the standpoint of operational characteristics of the renewed tip, it requires time and labor. Particularly in the case of soldering machines of the automatic and semi-automatic type, it is undesirable to shut down the operation to remove or renew the ineffective tips. After a certain number of operations, the tip has to be cleaned with a file to get direct contact of copper with the solder. To overcome this difficulty, soldering tips are also made from iron or stainless steel or other metals.

Soldering tips made from stainless steel do not dissolve in the solder. However, the heat conductivity of stainless steel is less than fifteen percent of the conductivity of copper. For this reason all stainless steel soldering tips have a copper or silver core to improve the flow of heat from the heater to the tip.

Between the heat conducting core and the heating coil, there must be electrical insulation which reduces the flow of heat because all common electrical insulators are poor heat conductors.

The disadvantages of the present soldering tips are: First, solder sticks to the tip, therefore cleaning is frequently needed. Second, the heater cannot be placed close to the tip, and consequently, there is reduced heat transfer to the tip. Third, the low thermal conductivity of insulators used to electrically insulate the heater coil from the tip causes a loss of power, and therefore, soldering iron tips of the present art have much higher power requirements than are needed for the soldering operation proper and developed heat is uncomfortable to the operator.

An object of this invention is to provide a soldering iron tip composed of a material which is an electrical insulator and which has good thermal conductivity.

It is another object of this invention to provide a soldering iron in which the tip is an electrical insulator, has good thermal conductivity and can be attached directly to the heating coil.

It is a feature of this invention to use beryllium oxide as a soldering iron tip, beryllium oxide being an electrical insulator and having exceptionally good thermal conductivity.

Another feature of this invention is a soldering iron tip which is made of insulating material having good thermal conductivity and which may be placed in contact with the heating coil without the use of an insulator between the tip and the coil.

Still another feature of this invention is a soldering iron with a replaceable tip which can be fastened directly to the heating coil.

It is a further feature of this invention to provide a soldering iron tip into which the heating coil is permanently embedded.

The above-mentioned and other features and objects of this invention will become more apparent by reference to the following description taken in conjunction with the accompanying drawings, in which:

FIG. 1 is a sectional view of a soldering iron illustrating one embodiment of this invention;

FIG. 2 is a sectional view of another embodiment;

FIG. 3 is a sectional view of an alternative embodiment; and

FIG. 4 is a sectional view of still another embodiment.

The figures show several embodiments of a soldering iron utilizing the soldering tip of this invention comprised of material which has good electrical insulating properties and good thermal conductivity, such as beryllium oxide. Beryllium oxide is a refractory oxide of the light metal, beryllium. The pure oxide is white and light in weight. Properties of beryllium oxide bodies are affected by variables, such as density, purity, method of fabrication, sinterability and temperature history. Beryllium oxide, or "beryllia," has certain unusual properties normally not associated with ceramic refractory materials. It is a material with unusually high thermal conductivity coupled with a favorable specific heat producing a favorable material as a heat transfer medium. The heat transfer characteristic is also one of the principal reasons for the resistance of beryllia to thermal shock. The high melting point (2545° C.), high electrical resistance ($10^{13}$ ohm-cm. at 20° C.), and excellent resistance of beryllia to great blasts of heat have warranted the consideration of beryllium oxide for specialized high-temperature applications. Beryllia bodies possess good tensile strength ($17.5 \times 10^3$ p.s.i. at 20° C.), good compressive strength ($200 \times 10^3$ p.s.i. at 20° C.), good hardness (9, Moh's scale) and a high modulus of elasticity ($45 \times 10^6$ p.s.i. at 20° C.). Beryllia is an ideal melting crucible material possessing a high degree of chemical inertness to melts of most metals. Generally, it is stable toward most materials except hydrofluoric acid and fused alkalies. Elevated temperature studies indicate that strength of beryllia bodies will gradually decrease to about half the room temperature values at temperatures of 800° C. to 1100° C. (1472° F. to 2012° F.). This occurrence when properly considered can be satisfactorily compensated for at the design stage. Beryllia bodies have been successfully used in ambient temperatures of 1750° C. to 1950° C. (3182° F. to 3542° F.).

A soldering tip made from beryllia surmounts the difficulties experienced with copper soldering tips. Solder does not adhere to the beryllia tip. Beryllia being a ceramic rather than a metal will not form an alloy with solder. Nor is beryllia attacked by the fluxes used with solders. Thus, the beryllia tip does not become pitted or corroded. Likewise beryllia tips do not require filing or frequent cleaning.

Beryllia is a non-conductor of electricity. Thus, the bare electrically conductive resistance coil of the soldering iron may be placed in direct contact with the beryllia tip, no electrical insulation being needed. The result is a smaller, more compact tip. Also, since electrical insulation is usually a poor conductor of heat, the elimination of the insulation causes an improved heat flow from coil to tip. Beryllia is a good thermal conductor (125 B.t.u./hr./ft.$^2$/° F./ft. at room temperature) which makes the material a good heat transfer medium. Further, since heat transfer is more effective, heat losses are less, and power requirements are reduced to achieve the same soldering efficiency.

In FIG. 1, the handle 1 is threaded at one end and coupled to a retaining sleeve 2 by a metallic collar 3. The handle 1 is made from an electrical insulating material which is a poor conductor of heat. The collar 3 and sleeve 2 are made of metal to enable them to withstand high temperatures. A soldering tip 4 made of beryllium oxide is located inside the metallic sleeve 2. A resistance coil 5 is wound directly onto the soldering tip with the return wire being disposed in a slot 5a in the tip 4. An insulator 6 electrically isolates the coil 5 from the sleeve 2. The coil 5 is connected by an electrical conductor 7 to a male plug 8 located inside the handle 1. Connection with an outside source of electrical energy is made by a second conductor 10 which passes through end cap 9 and is terminated in a female connector 11, into which is inserted the male plug 8. End cap 9 is threadably engaged with the end of the handle 1. To change the soldering tip, the sleeve 2 is unscrewed permitting the removal of the soldering tip. The end cap 9 is also unscrewed so that the conductor 7 may be unplugged from the connector 11. After the end cap 9 and the collar 3 are unscrewed from the handle 1, the tip 4 can be detached from the heating coil 5 and a new soldering tip inserted into the coil. The assembly of the tip and the conductor 7 to the handle 1 can then be made as before.

With reference to FIGURE 2, the handle 1' is of a similar configuration and threadably engages a coupling 3'. The soldering tip 12 is a sliding fit into the metallic coupling 3' and is held in place by a set screw 13. A resistance coil 14 is wound on a ceramic insulator 15 in the form of a helix in helical grooves cut into the insulator 15. The soldering tip 12 has a cavity 16, the inside diameter of which is large enough to fit over the outside diameter of the helical winding of resistance coil 14. One end of the resistance coil 14 passes through a passage in the center of the ceramic insulator 15 and is connected to a conductor 7' for connection to a source of electrical energy, as was shown in FIGURE 1. To replace the tip 12, it is necessary only to loosen set screw 13 and pull out the tip from the coupling 3'. The soldering tip 12 is composed of beryllium oxide. In this embodiment, the additional advantage of the hollow configuration is that it permits a relatively thin wall design causing better heat transfer. The helical grooves in the ceramic insulator 15 space the turns of the resistance coil 14 and can be made close together or farther apart as more or less heat is desired. The resistance coil is in direct contact with the inner surface of the tip cavity, thus permitting highly efficient heat transfer.

In FIG. 3, a ceramic insulator 17 is placed in one end of a coupling 18 which threadably engages the handle 1''. The insulator 17 has a hollow 19 and a helical groove 20 is cut in the cylindrical surface of the hollow 19 to receive a resistance coil 21 which is in the shape of a helix. The coil 21 is disposed partly within the groove 20 in the insulator 17 with a portion of the coil protruding into the hollow 19 thus forming a female thread. A soldering tip 22 made from beryllium oxide has a matching helical groove 23 on the upper cylindrical surface 24 so that it may be threaded into the helical resistance coil 21. The two ends of resistance coil 21 are connected by conductor 7' to an external source of electrical energy (not shown) as in FIGURE 1. The improvement offered by this soldering tip is extremely simple tip replacement means, when a tip is worn out or a different type tip point is desired for specific application. In addition, the helical groove in the tip which threads on to the resistance coil provides an increased area of contact with the coil, thus increasing the efficiency of the heat transfer in this embodiment, as well as in the embodiment of FIG. 2.

Referring to FIG. 4, a soldering tip 24 of this invention is disposed inside a sleeve 25. The sleeve 25 has an inner configuration corresponding with the outside shape of the soldering tip 24. The soldering tip 24 has a cavity 26 which is filled with compressed beryllium oxide powder material 27 and packed tightly around a resistance coil 28 for good contact with the coil 28 to insure maximum heat transfer through the beryllium oxide powder material 27 to the soldering tip 24. The sleeve 25 which retains the tip 24 in place is secured to coupling 31 by clamping nut 29. Coupling 31 threadably engages handle 1 which is of the same configuration as in FIGURE 1. In this embodiment, the tip is effectively composed of two portions: the solid, protruding tip proper 24 and the densely packed material 27. The powder material 27 is retained in the cavity 26 by a ceramic plate 30 which is cemented to the tip 24. The tip 24, resistance coil 28, powder material 27, plate 30 and conductor 7' can be made as a replaceable unit with the handle 1 having an internal plug and connector arrangement.

While I have described above the principles of my invention in connection with specific apparatus, it is to be clearly understood that this description is made only by way of example and not as a limitation to the scope of my invention as set forth in the objects thereof and in the accompanying claims.

I claim:
1. A soldering iron comprising a handle of electrically insulating material having relatively low thermal conductivity, a cylindrically shaped body of beryllium oxide forming a soldering iron tip having a tapered extremity forming a work contacting surface, means for securing said body to said handle with said tapered portion exposed, an electrically conductive resistance coil disposed in contacting relationship with at least a portion of said body and electrical coupling means carried by said handle and connected with said coil to couple electrical energy to said resistance coil.

2. The device of claim 1 wherein said tip having relatively low heat conductivity, a cylindrical soldering tip of berryllium oxide tapered at an extremity thereof said tip includes a helical groove on a portion of the surface thereof, an electrical insulator having a cavity, the surface of said cavity having a helical groove therein with the same pitch and direction as the groove in the surface of said tip, said electrically conductive resistance coil being in the form of a helix disposed within said grooves in said insulator and forming a female thread, means coupling said coil and said electrical insulator to said handle, said tip being adapted to be threaded into said coil and to be retained therein.

3. The device of claim 1 wherein said body has a cavity therein and an electrical insulator within said cavity, said electrically conductive resistance coil being wound about said insulator in direct contact with the surface of said cavity.

4. The device of claim 3 wherein said insulator is in the form of powder filling said cavity.

(References on following page)

References Cited in the file of this patent

UNITED STATES PATENTS

| | | |
|---|---|---|
| 1,096,688 | Dantsizen | May 12, 1914 |
| 1,378,324 | Clark et al. | May 17, 1921 |
| 1,656,690 | Blackburn | Jan. 17, 1928 |
| 2,011,173 | Crowley | Aug. 13, 1935 |
| 2,033,300 | Reichmann | Mar. 10, 1936 |
| 2,126,559 | Kirkpatrick | Aug. 9, 1938 |
| 2,243,549 | Yocom | May 27, 1941 |
| 2,474,312 | Halpern | June 28, 1949 |
| 2,501,616 | Robinson | Mar. 21, 1950 |
| 2,608,745 | Barry | Sept. 2, 1952 |
| 2,747,074 | Finch | May 22, 1956 |
| 2,785,267 | Wickersham et al. | Mar. 12, 1957 |